(12) United States Patent
Fukui et al.

(10) Patent No.: US 8,403,801 B2
(45) Date of Patent: Mar. 26, 2013

(54) BICYCLE HUB TRANSMISSION AND HUB TRANSMISSION SHIFTING METHOD

(75) Inventors: Seiji Fukui, Sakai (JP); Shinji Kawamura, Sakai (JP)

(73) Assignee: Shimano Inc., Osaka (JP)

( * ) Notice: Subject to any disclaimer, the term of this patent is extended or adjusted under 35 U.S.C. 154(b) by 1441 days.

(21) Appl. No.: 12/029,658

(22) Filed: Feb. 12, 2008

(65) Prior Publication Data

US 2009/0203490 A1    Aug. 13, 2009

(51) Int. Cl.
*F16H 3/62*    (2006.01)
(52) U.S. Cl. .................. 475/276; 475/297; 475/298
(58) Field of Classification Search .............. 475/276, 475/297–298
See application file for complete search history.

(56) References Cited

U.S. PATENT DOCUMENTS

| | | | |
|---|---|---|---|
| 3,608,398 A | 9/1971 | Segawa et al. | |
| 5,964,679 A | 10/1999 | Matsuo et al. | |
| 6,533,700 B2 | 3/2003 | Shoge | |
| 6,572,508 B2 | 6/2003 | Shoge | |
| 6,607,465 B1 | 8/2003 | Shoge | |
| 6,641,500 B2 * | 11/2003 | Shoge | 475/276 |
| 6,875,150 B2 | 4/2005 | Matsuo et al. | |

FOREIGN PATENT DOCUMENTS

| | | |
|---|---|---|
| AT | 306536 | 4/1973 |
| EP | 0 537 693 A1 | 4/1993 |
| EP | 0 763 461 A2 | 3/1997 |
| EP | 1 323 627 A2 | 7/2003 |
| JP | 54-101050 A | 8/1979 |
| WO | WO-99/36307 | 7/1999 |

* cited by examiner

*Primary Examiner* — David D Le
*Assistant Examiner* — Derek D Knight
(74) *Attorney, Agent, or Firm* — Global IP Counselors, LLP

(57) ABSTRACT

A bicycle hub transmission includes a hub axle, a driver, a hub shell, a power transmission mechanism and an auxiliary power transmission mechanism. The driver is rotatably supported by the hub axle. The hub shell is rotatably supported by the hub axle with the power transmission mechanism is operatively disposed therebetween to transmit rotational power from the driver to the hub shell through power transmission paths. The shift mechanism is operatively coupled to the power transmission mechanism to select one of the power transmission paths. The auxiliary power transmission mechanism is disposed between the driver and the hub shell to transmit rotational power from the driver to the hub shell through an auxiliary power transmission path during shifting such that a load path of the power transmission mechanism for the power transmission path being shift to is placed in a substantially unloaded state with the auxiliary power transmission path carrying the load.

13 Claims, 16 Drawing Sheets

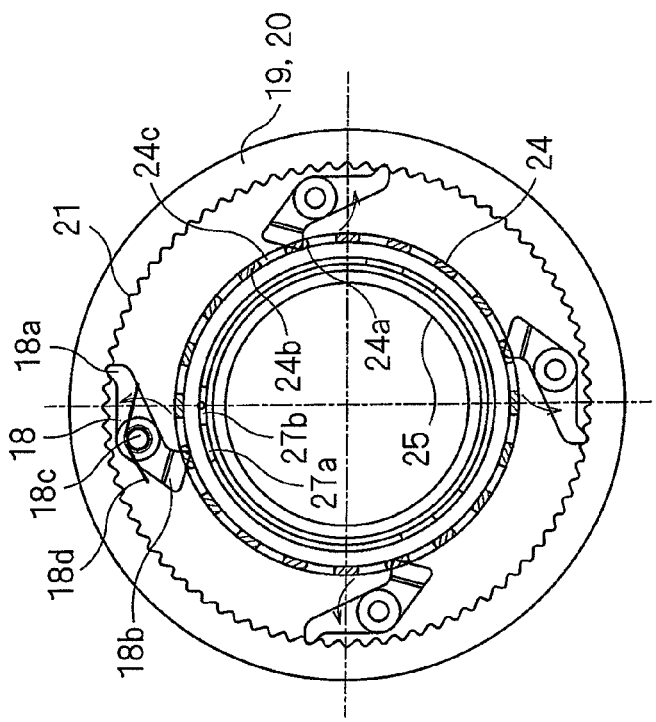
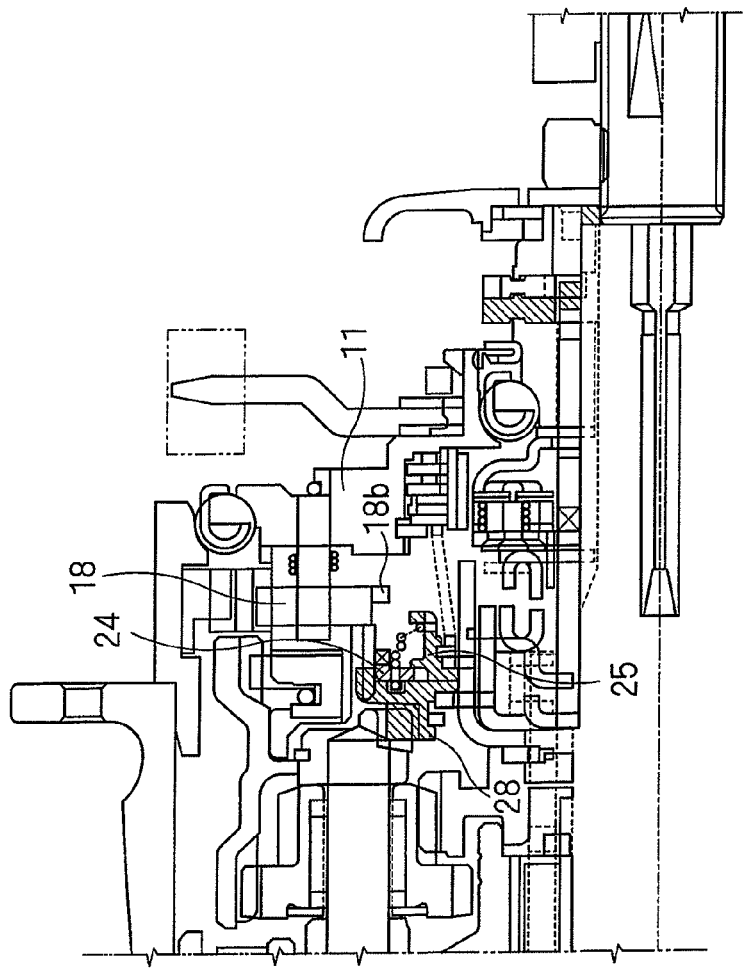
F I G. 2 b
F I G. 2 a

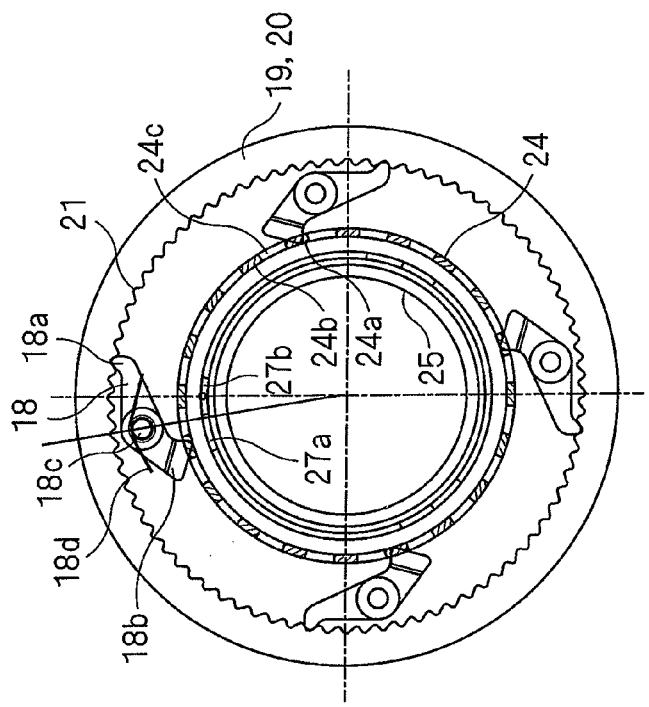
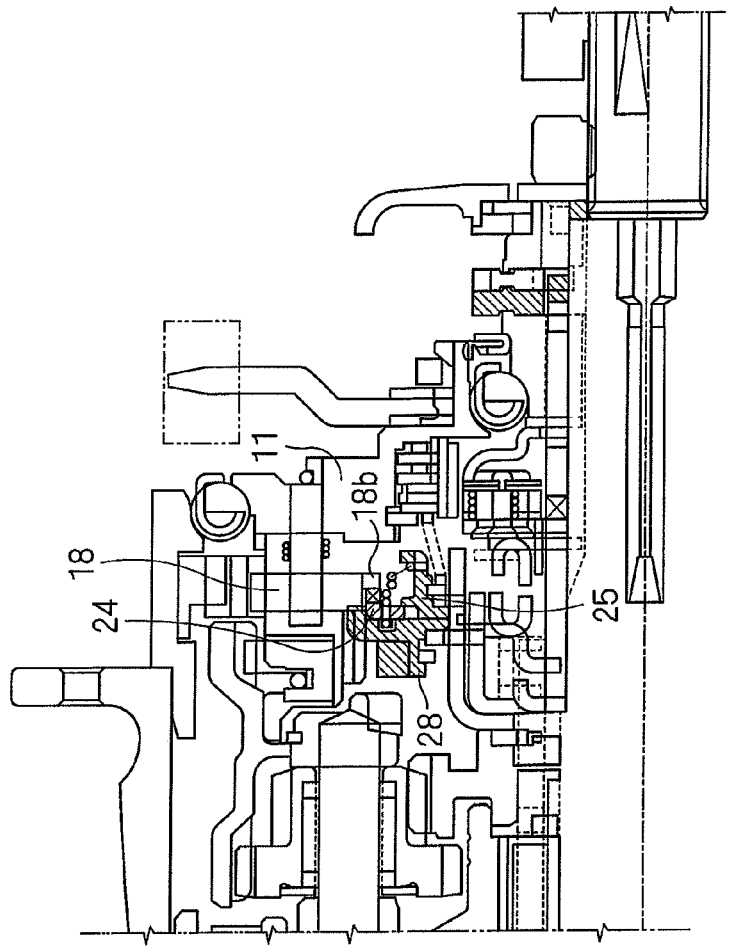
FIG. 3b
FIG. 3a

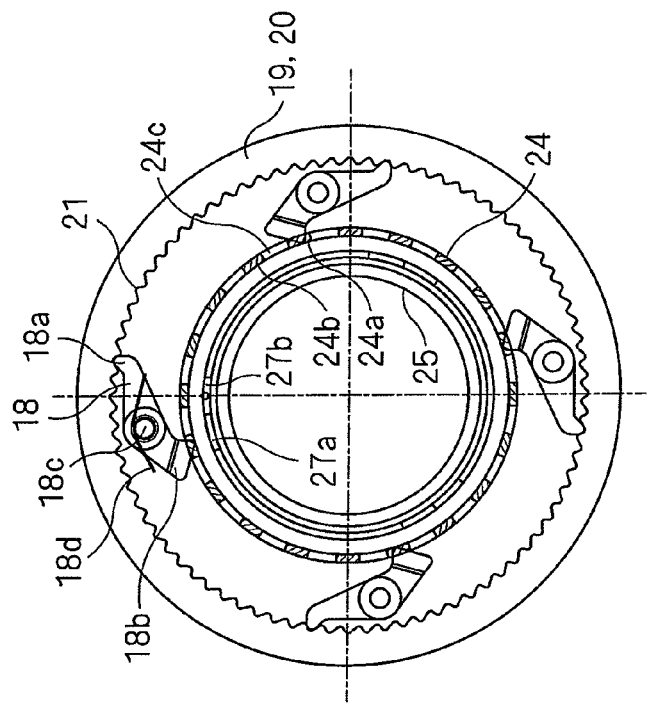
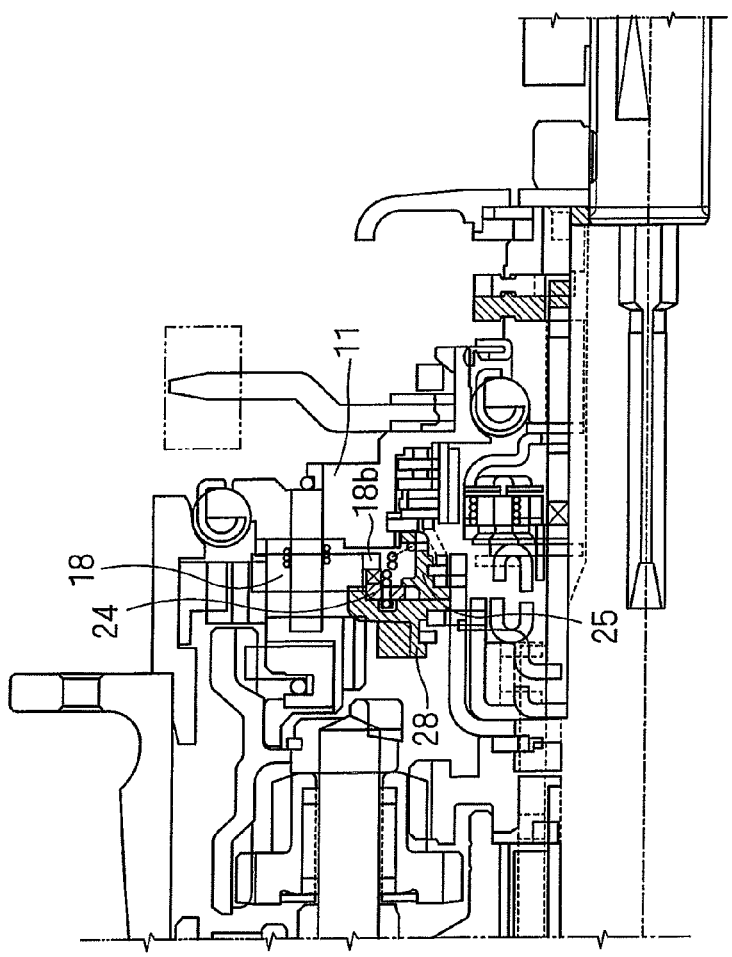
FIG. 4b
FIG. 4a

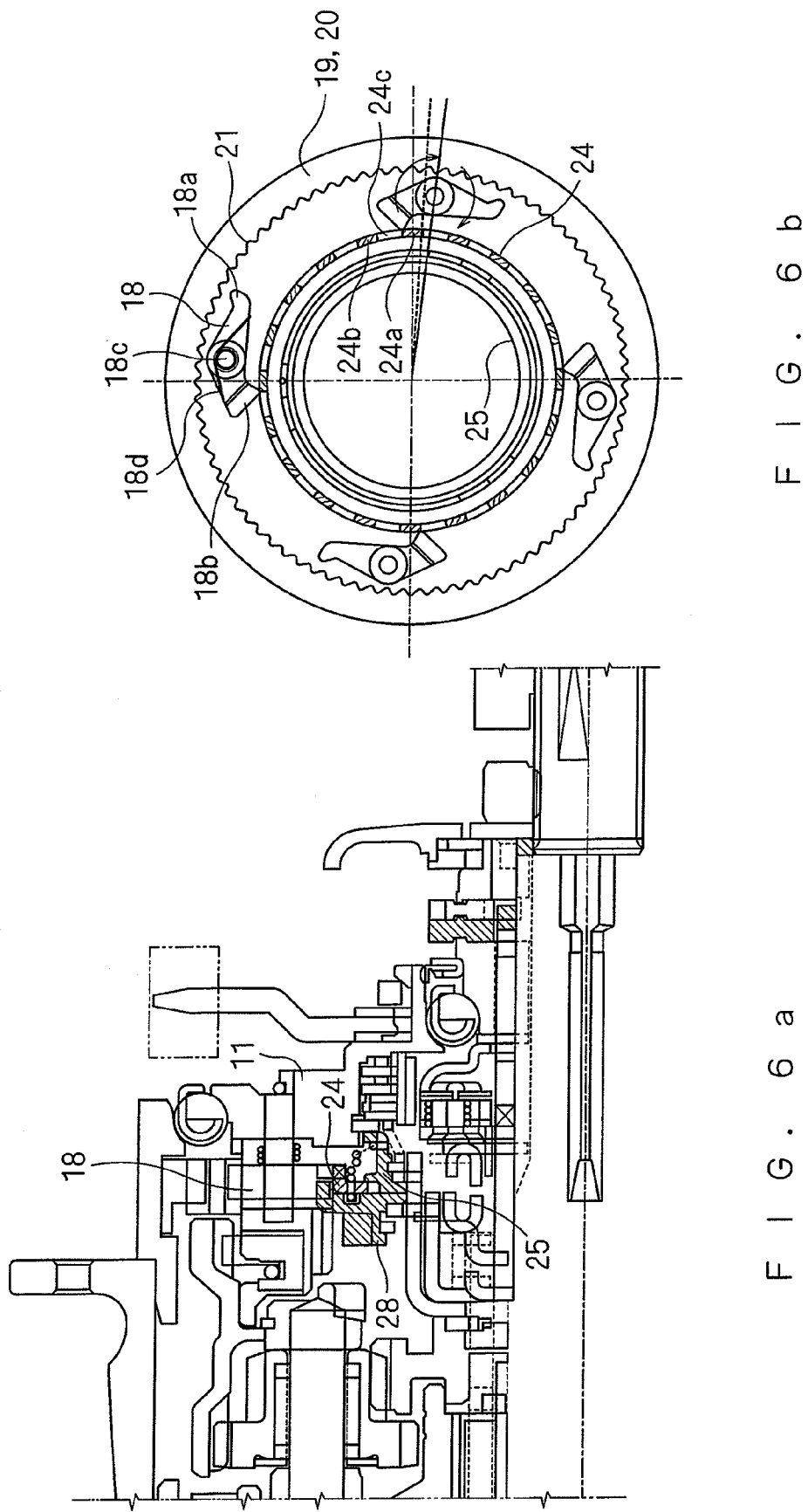

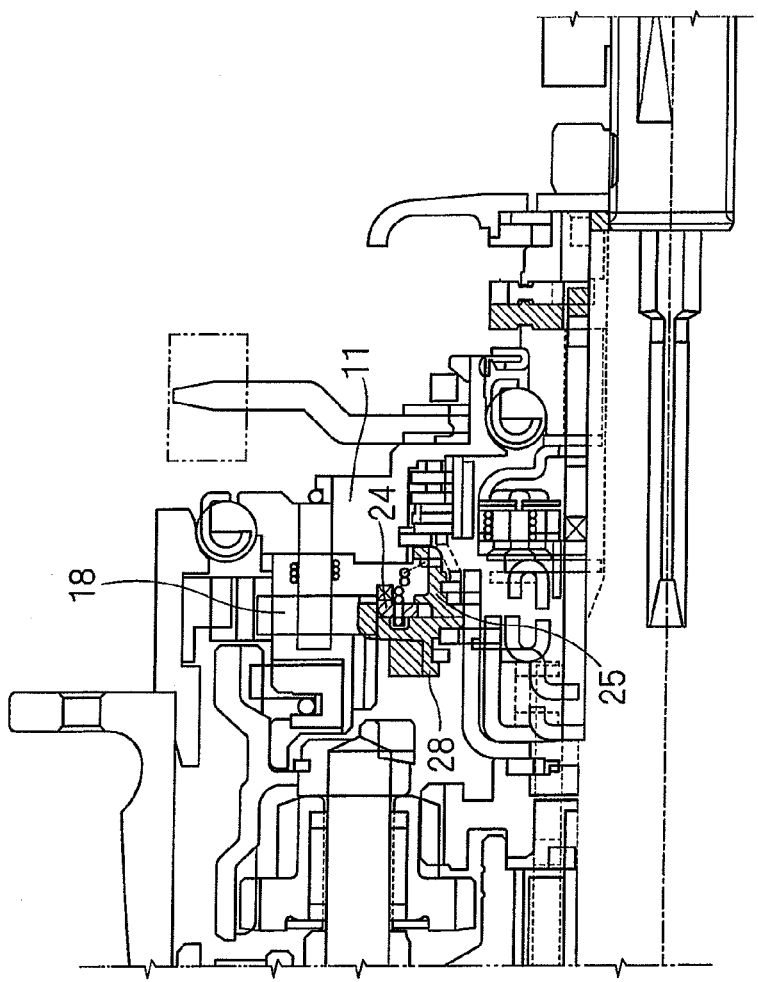
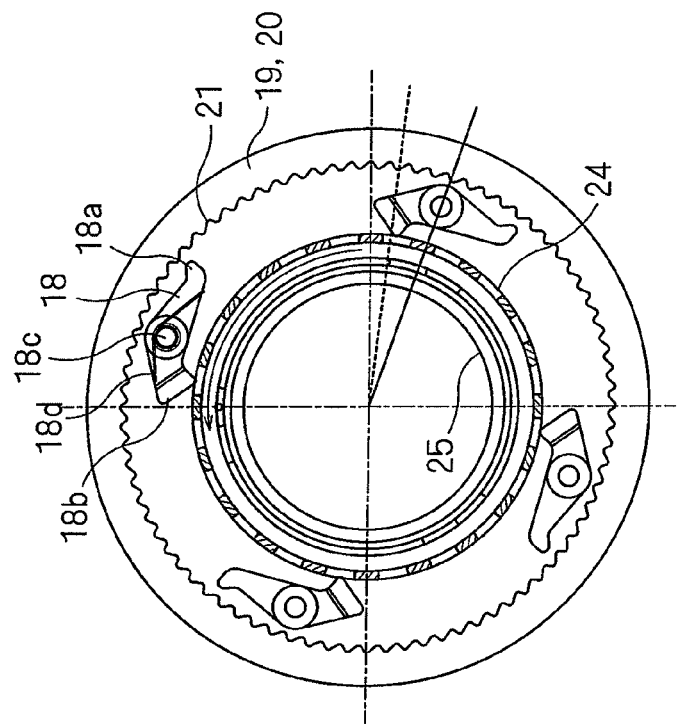
FIG. 7a
FIG. 7b

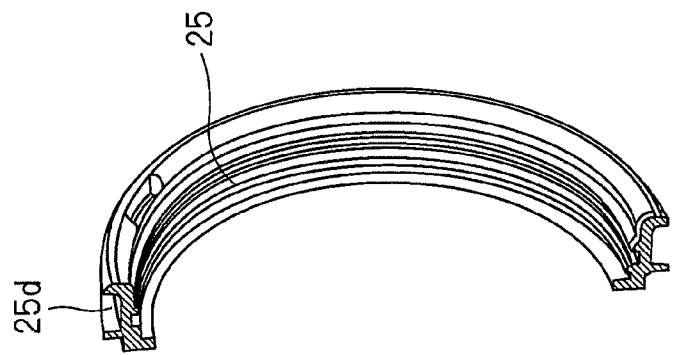
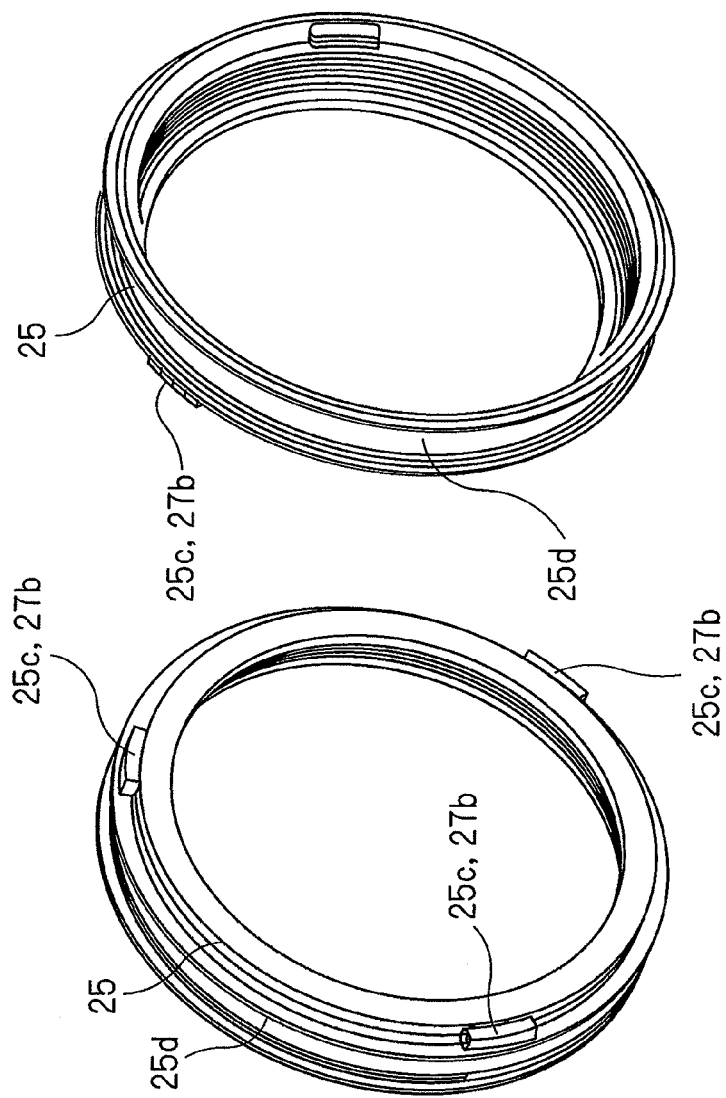
FIG. 13a  FIG. 13b  FIG. 13c

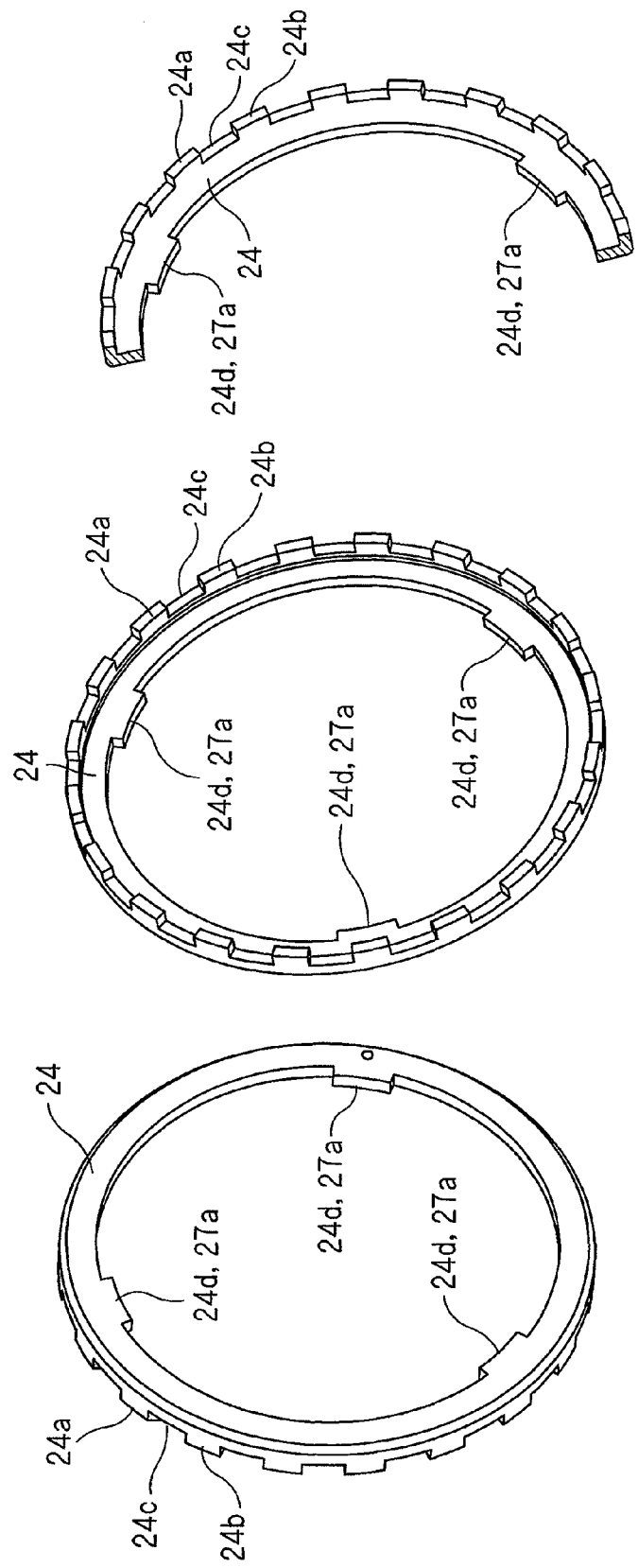
F I G . 1 4 a
F I G . 1 4 b
F I G . 1 4 c

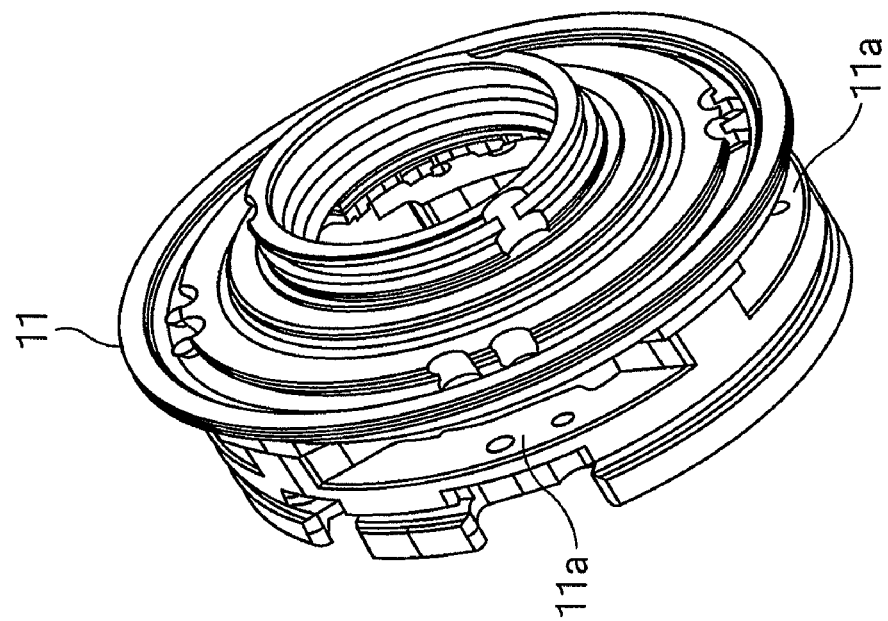
F I G. 1 5 b
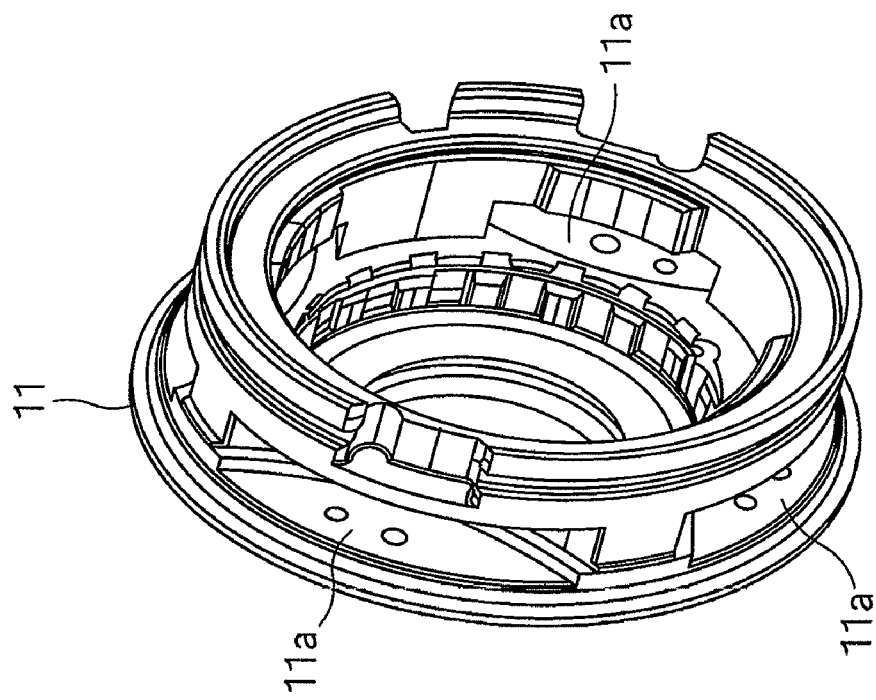
F I G. 1 5 a

BICYCLE HUB TRANSMISSION AND HUB TRANSMISSION SHIFTING METHOD

BACKGROUND OF THE INVENTION

1. Field of the Invention

This invention generally relates to a hub transmission for a bicycle. More specifically, the present invention relates to a multi-speed hub transmission with a plurality of power transmission paths. The present invention further relates to a method for shifting such a hub transmission.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Recently, the bicycle drive train has been extensively redesigned.

One type of a bicycle drive train utilizes an internally mounted multi-speed hub transmission for changing gears. Internally mounted multi-speed hub transmissions form part of the rear wheel of a bicycle. An internally mounted multi-speed hub transmission basically includes a hub axle that is mounted to the bicycle frame, a driver rotatably supported by the hub axle for receiving a pedalling force, and a hub shell rotatably supported by the hub axle. A power transmission mechanism is disposed between the driver and the hub shell transmitting rotational power from the driver to the hub shell through a plurality of power transmission paths. The hub transmission further comprises a shift mechanism that cooperates with the power transmission mechanism for selecting one of the pluralities of power transmission paths.

The power transmission mechanism typically includes a planetary gear mechanism with a plurality of sun gears, at least one ring gear and a planet gear carrier each of which is rotatably supported by the hub axle. The planet gears are rotatably supported by the planet gear carrier meshing with the sun gears and the ring gears. To change the power transmission paths and the corresponding gear ratios, the aforementioned various gear components are selectively non-rotatably coupled with each other by actuating the shift mechanism.

An example of this kind of a bicycle hub transmission is disclosed in European Patent Publication No. 1 323 627 A2. The hub transmission according to this publication is configured to provide for 8 speed stages. In speed stages 5 to 8, the driver is coupled with the planet gear carrier by a clutch, while in speed stages 1 to 4, the driver is uncoupled from the planet gear carrier. This change of the power transmission path when shifting between speed stages 4 and 5 is problematic in view of a desired shock-less shifting. To alleviate this problem, this publication proposes a particular timing of the coupling mechanisms that includes a shifting transition sequence. That is, when the bicycle is accelerating and the cyclist shifts from speed stage 4 to speed stage 5, the planetary gear mechanism is actuated to produce gear ratios corresponding to speed stages 3 and 7 prior to completing the shift to speed stage 5. Thereby, an undesired rapid acceleration of the pedals and a significant shock is avoided when the transmission completes the shift to speed stage 5.

When the bicycle is decelerating and the cyclist shifts from speed stage 5 to speed stage 4, a temporary transition from speed stage 5 to speed stage 7 and then to speed stage 3 prior to completing the shift to speed stage 4 is carried out to avoid a rapid deceleration of the pedals.

While the aforementioned shifting transition sequence reduces excessive acceleration or deceleration of the pedals when shifting between speed stages 4 and 5, the cyclist still feels a (reduced) shifting shock that still causes undesired discomfort.

In view of the above, it will be apparent to those skilled in the art from this disclosure that there exists a need for an improved bicycle hub transmission. This invention addresses this need in the art as well as other needs, which will become apparent to those skilled in the art from this disclosure.

SUMMARY OF THE INVENTION

One object of the present invention is to a bicycle hub transmission with an improvement with respect to a shock-less shifting of the transmission. Moreover, it is an object of the invention to provide a method for shifting such a hub transmission.

The foregoing objects can basically be attained by providing a bicycle hub transmission that basically comprises a hub axle, a driver, a hub shell, a power transmission mechanism and an auxiliary power transmission mechanism. The driver is rotatably supported by the hub axle. The hub shell is rotatably supported by the hub axle. The power transmission mechanism is operatively disposed between the driver and the hub shell to transmit rotational power from the driver to the hub shell through a plurality of power transmission paths. The shift mechanism is operatively coupled to the power transmission mechanism to select one of the power transmission paths. The auxiliary power transmission mechanism is disposed between the driver and the hub shell to transmit rotational power from the driver to the hub shell through an auxiliary power transmission path during shifting such that a load path of the power transmission mechanism for the power transmission path being shift to is placed in a substantially unloaded state with the auxiliary power transmission path carrying the load.

The hub transmission of the present invention provides the benefit that the auxiliary power transmission mechanism allows to establish an auxiliary power transmission path for communicating the rotational power from the driver to the hub shell, thereby circumventing the power transmission mechanism. Thus, the auxiliary power transmission mechanism functions as a bypass that continues transmitting rotational power from the driver to the hub shell with the effect that the power transmission mechanism can be shifted in an unloaded state. Since the power transmission mechanism does not communicate rotational power from the driver to the hub shell and, thus, is not effective when shifting between two speed stages, undesired shifting shocks and rapid acceleration/deceleration of the pedals are avoided.

Moreover, the improved shock-less, or at least shock-reduced, shifting can be achieved according to the invention without applying a complicated shifting transition sequence. Rather, the desired effect is achieved by a relatively simple and compact structure.

Preferably the auxiliary power transmission mechanism comprises a power transmission unit for coupling the driver to the hub shell and a clutch unit for actuating the power transmission unit. This configuration has the advantage that the auxiliary power transmission mechanism can be coupled/uncoupled with components of the power transmission mechanism, for example a planet gear carrier.

To achieve a compact design of the hub transmission, the auxiliary power transmission mechanism may comprise at least one pawl coupled to the driver and a pawl engaging device, in particular a ratchet ring coupled to the hub shell wherein the pawl and the pawl engaging device, in particular the ratchet ring are engagable to transmit rotational power. The pawl can be rotatably movably supported by the driver which allows for engagement/disengagement of the pawl with the ratchet ring in different positions. The pawl may be axially movably supported by the driver. Alternatively, the pawl may be axially fixed to the driver. The axially movable arrangement and the axially fixed arrangement of the rotatably movable pawl provide two different designs to actuate the auxiliary power transmission mechanism, in particular to engage/disengage the power transmission unit and the clutch unit.

Preferably, the ratchet ring comprises a friction rotating body including a plurality of ratchet teeth on an inner peripheral surface of the friction rotating body. In particular, in conjunction with a friction spring that is connected to the friction rotating body and that is disposed between the friction rotating body and the hub shell, this embodiment has the advantage that the friction rotation body can be locked/unlocked with the hub shell, and a power transmission path between the driver and the hub shell is established or interrupted.

Preferably, the clutch unit comprises a control ring that is coupled to the shift mechanism and movably disposed for coupling and decoupling with the transmission auxiliary mechanism. By using the control ring it is possible to actuate the auxiliary power transmission mechanism through the clutch unit by moving the shift mechanism. The control ring may be rotatably and axially movably disposed relative to the hub axle. More particularly, the control ring may be supported by a differential rotation body with the control ring being rotatably movable relative to the differential rotation body. The differential rotation body may be axially movable relative to the hub axle. Thereby, the control ring is allowed to rotate and axially move which provides for a flexible operation of the auxiliary power transmission mechanism.

Preferably, the control ring is axially fixed to the differential rotation body. The axially fixed control ring is suitable to be used in one embodiment according to which the pawl is axially movably supported by the driver. Thereby, the axial relative movement between the pawl and the control ring for the engagement/disengagement function is effected by the pawl.

Alternatively, the control ring may be axially movable relative to the differential rotation body. The axially movable control ring is suitable to be combined with another embodiment according to which the pawl is axially fixed to the driver. Thereby, the axial relative movement between the control ring and the pawl for the engagement/disengagement function is effected by the control ring.

To support the disengagement function of the auxiliary power transmission mechanism, the control ring and the differential rotational body may comprise rotation limiting structure that stop a rotational movement of the control ring. The control ring can be biased in a circumferential and axial direction which allows returning of the control ring to an initial position both with respect to the rotational and axial movement of the control ring.

The clutch unit preferably comprises a clutch ring engagable with a planet gear carrier of the power transmission mechanism wherein the clutch ring and the differential rotational body are coupled and axially movable. This embodiment has the effect to correlate the operation of the auxiliary power transmission mechanism with various speed stages that can be produced by the power transmission mechanism.

As regards the inventive method, the invention comprises the idea to select one of a plurality of power transmission paths of a power transmission mechanism with an auxiliary power transmission path being established during shifting such that the power transmission path is selected in a substantially unloaded state of the power transmission mechanism.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2a is a partial view of a hub transmission similar to the hub transmission according to FIG. 1, with the auxiliary power transmission mechanism in an initial position for speed stages 5 to 8;

FIG. 2b is an axial elevational view of the auxiliary power transmission mechanism in the state according to FIG. 2a;

FIG. 3a illustrates the hub transmission according to FIG. 2a with the control ring of the auxiliary power transmission mechanism contacting the pawl;

FIG. 3b is an axial elevational view of the auxiliary power transmission mechanism in the state according to FIG. 3a;

FIG. 4a illustrates the hub transmission according to FIG. 2a with the pawls of the auxiliary power transmission mechanism being in a side end position;

FIG. 4b is an axial elevational view of the auxiliary power transmission mechanism in the state according to FIG. 4a;

FIG. 5b is an axial elevational view of the auxiliary power transmission mechanism in the state according to FIG. 5a;

FIG. 6a illustrates the hub transmission according to FIG. 2a in a state with the pawls of the auxiliary power transmission mechanism being in an intermediate position and disengaged;

FIG. 6b is an axial elevational view of the auxiliary power transmission mechanism in the state according to FIG. 6a;

FIG. 7a illustrates the hub transmission according to FIG. 2a with the pawls being in an initial position for speed stages 1 to 4;

FIG. 7b is an axial elevational view of the auxiliary power transmission mechanism in the state according to FIG. 7a;

FIG. 13a to 13c are perspective views of the differential rotational body;

FIG. 14a to 14c are perspective views of the control ring; and

FIG. 15a to 15b are perspective views of the driver.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
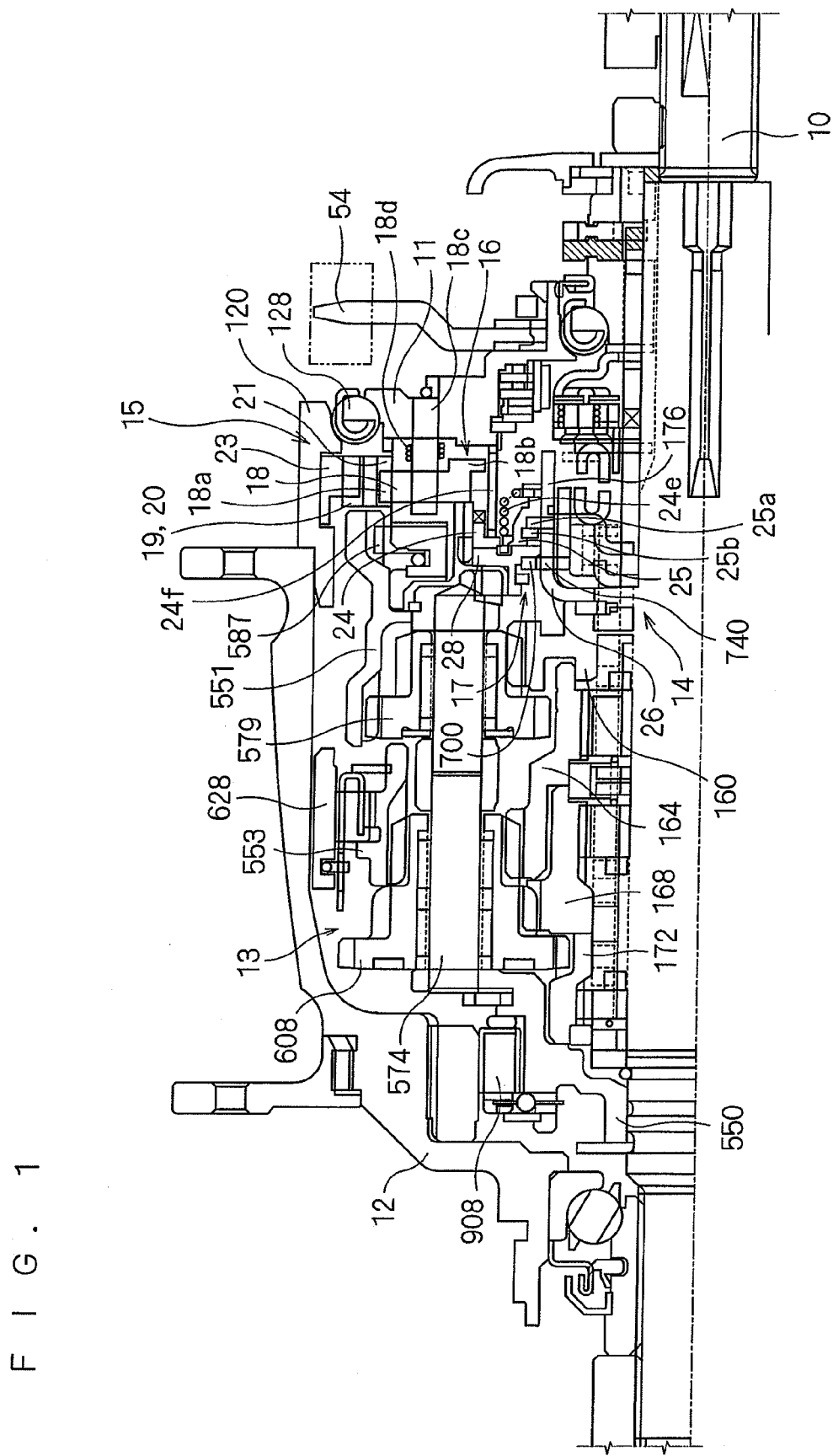
FIG. 1 is a longitudinal cross-sectional view of a hub transmission according to an embodiment.

Referring initially to FIG. 1, a bicycle hub transmission is illustrated in accordance with one embodiment of the present invention. FIG. 1 is a longitudinal cross-sectional view of the inventive hub transmission that is mounted to the rear wheel of a bicycle. The hub transmission basically includes a hub axle 10, a driver 11 and a hub shell 12 each of which are rotatably supported by hub axle 10. The hub transmission further includes a power transmission mechanism 13 that is disposed between the driver 11 and the hub shell 12. In operation, the power transmission mechanism transmits rotational power from the driver 11 to the hub shell 12 through a plurality of power transmission paths that can be selected by a shift mechanism 14.

As an additional means to transmit rotational power from the driver 11 to the hub shell 12, an auxiliary power transmission mechanism 15 is provided that is disposed between the driver 11 and the hub shell 12. As will be explained in more detail, the auxiliary power transmission mechanism 15 serves as a bypass that allows to maintain a power transmission path while the power transmission mechanism is released and can be shifted from one speed stage to another speed stage in an unloaded state. Thereby, the shifting comfort of the hub transmission is significantly improved and shifting shocks are avoided.

The rotational force is transmitted to the hub transmission by a chain and a sprocket 54 that is coupled to the driver 11. On the side of the driver 11, a (right) cup 120 is non-rotatably fitted to an inner peripheral surface of hub shell 12. The cup 120 rotatably supports the hub shell 12 on the driver 11 through ball bearings 128.

The power transmission mechanism 13 corresponds to the power transmission mechanism described in European Patent Publication No. 1 323 627 A2 in great detail. The shift mechanism 14 corresponds to the shift mechanism described in European Patent Publication No. 1 323 627 A2 and U.S. Pat. No. 6,607,465 B1 mentioned therein. In the following, the structure of the power transmission mechanism 13 and the shift mechanism 14 is explained only as necessary for a proper understanding of the auxiliary power transmission mechanism 15.

The power transmission mechanism 13 comprises four sun gears 160, 164, 168 and 172. The first sun gear 160 is non-rotatably connected to the hub axle 10. The second, third and fourth sun gears 164, 168, 172 are rotatably supported by the axle 10 and can be selectively locked by pawls in a known manner. The shift mechanism 14 is adapted to selectively actuate the pawls by a shift control sleeve as described in detail in European Patent Publication No. 1 323 627 A2 as well as in U.S. Pat. No. 6,607,465 B1.

The power transmission mechanism 13 further comprises a planet gear carrier 550, a first ring gear 551 and a second ring gear 553, all of which are rotatably mounted on the axle 10. The planet gear carrier 550 comprises a plurality (e.g., three) of master pinion pins 574 that are rotatably supported by the planet gear carrier 550. Each of the master pinion pins 574 supports two planet gears 579, 608. The first planet gear 579 has two different diameter gear portions, one of which meshes with the first sun gear 160 and the other one with the first ring gear 551. The second planet gear 608 has three different diameter gear portions that mesh with the second, third and fourth sun gears 164, 168 and 172.

The smallest gear portion of the second planet gear 608 also meshes with second ring gear 553. The planet gear carrier 550 is coupled to the hub shell 12 by a coupling mechanism 908. The second ring gear 553 is coupled to the hub shell 12 by a roller clutch 628.

To transmit rotational power from the driver 11 to the power transmission mechanism 13, the driver 11 meshes with the clutch ring 28 that is engagable with an end of the planet gear carrier 550 distant from the coupling mechanism 908. In addition thereto, the driver 11 meshes with the first ring gear 551 by the pawls 587 that are circumferentially mounted on an outer peripheral surface of the driver 11. To engage and release the clutch ring 28, a shift key member 700 comprising radially inwardly extending cam followers 740 is provided.

The cam followers 740 are guided in a clutch cam portion 176 of the first sun gear 160 that includes a first and second cam step (no reference signs). The clutch cam portion 176 forms part of the feed cam 26. When the shift key member 700 is rotated, the cam followers 740 move in the feed cam 26 between first and second cam steps as shown in FIGS. 2a and 3a. Thereby, the clutch ring 28 can be axially moved to disengage/engage the clutch ring 28 with the planet gear carrier 550 (engaged state: FIG. 2a; disengaged state: FIG. 3a).

The shift key member 700 is actuated by the shift mechanism 14 as described in detail in European Patent Publication No. 1 323 627 A2.

For speed stages 1 to 4, the clutch ring 28 is disengaged from the planet gear carrier 550. Consequently, the rotational power is transmitted from the driver 11 over the pawl 587 to the first ring gear 551 and the planet gear carrier 550. For speed stages 5 to 8, the clutch ring 28 is engaged with the planet gear carrier 550 and the rotational power is transmitted from the driver 11 over the clutch ring 28 to the planet gear carrier 550. An overview over the specific power transmission paths for each speed stage is shown in following Table 1.

TABLE 1

| Speed Stage | Power Transmission Path |
|---|---|
| 1 | Driver 11, Pawl 587, First Ring Gear 551, Planet Gear Carrier 550 (planet gear 579 rotates around first sun gear 160), Pawl 908, Hub Shell 12 |
| 2 | Driver 11, Pawl 587, First Ring Gear 551, Planet Gear Carrier 550 (planet gear 579 rotates around first sun gear 160 and planet gear 608 rotates around fourth sun gear 172), Second Ring Gear 553, Roller Clutch 628, Hub Shell 12 |
| 3 | Driver 11, Pawl 587, First Ring Gear 551, Planet Gear Carrier 550 (planet gear 579 rotates around first sun gear 160 and planet gear 608 rotates around fourth sun gear 168), Second Ring Gear 553, Roller Clutch 628, Hub Shell 12 |
| 4 | Driver 11, Pawl 587, First Ring Gear 551, Planet Gear Carrier 550 (planet gear 579 rotates around first sun gear 160 and planet gear 608 rotates around fourth sun gear 164), Second Ring Gear 553, Roller Clutch 628, Hub Shell 12 |
| 5 | Driver 11, Clutch Ring 28, Planet Gear Carrier 550, Pawl 908, Hub Shell 12 |
| 6 | Driver 11, Clutch Ring 28, Planet Gear Carrier 550 (planet gear 608 rotates around fourth sun gear 172), Second Ring Gear 553, Roller Clutch 628, Hub Shell 12 |

TABLE 1-continued

| Speed Stage | Power Transmission Path |
|---|---|
| 7 | Driver 11, Clutch Ring 28, Planet Gear Carrier 550 (planet gear 608 rotates around third sun gear 168), Second Ring Gear 553, Roller Clutch 628, Hub Shell 12 |
| 8 | Driver 11, Clutch Ring 28, Planet Gear Carrier 550 (planet gear 608 rotates around second sun gear 164), Second Ring Gear 553, Roller Clutch 628, Hub Shell 12 |

Following Table 2 shows the coupling of the various components for each speed stage.

TABLE 2

| Speed Stage | Pawl 18 and Ratchet ring 19 | Clutch ring 28 and Planet carrier 550 | Second Sun gear 164 | Third Sun gear 168 | Fourth Sun gear 172 |
|---|---|---|---|---|---|
| 1 | Disengaged | Disengaged | Free | Free | Free |
| 2 | Disengaged | Disengaged | Free | Free | Locked |
| 3 | Disengaged | Disengaged | Free | Locked | Free |
| 4 | Disengaged | Disengaged | Locked | Free | Free |
| (Same as 5) | Engaged | Disengaged | Locked | Free | Free |
| (Same as 5) | Engaged | Disengaged | Free | Free | Free |
| 5 | Engaged | Engaged | Free | Free | Free |
| 6 | Engaged | Engaged | Free | Free | Locked |
| 7 | Engaged | Engaged | Free | Locked | Free |
| 8 | Engaged | Engaged | Locked | Free | Free |

In speed stages 5 to 8, the hub shell 12 rotates relative to the ratchet ring 19 due to the friction rotating body 20 and the friction spring 23 even though the pawl 18 and the ratchet ring 19 are engaged as will be explained in greater detail.

In the following the structure of the auxiliary power transmission mechanism 15 is described in more detail. The auxiliary power transmission mechanism 15 comprises a power transmission unit 16 and a clutch unit 17. The power transmission unit 16 couples driver 11 to the hub shell 12. The clutch unit 17 is provided for the actuating power transmission unit 16.

The power transmission unit 16 comprises at least one pawl 18, specifically four pawls 18 that are disposed circumferentially around the hub axle 10. The arrangement and structure of the pawls 18 can be seen in FIG. 2*b*. Each of the pawls 18 has two arms that form a tip 18*a* and a tail 18*b*. The arms with the tip 18*a* and the tail 18*b* are inclined with respect to each other to facilitate the engagement of the pawl 18 with adjacent components.

The tail 18*b* comprises a protrusion formed on the side of the pawl 18 proximate to the driver 11. The tip 18*a* is formed as a tooth that extends radially outwardly. The pawl 18 is connected with a pawl spring 18*d* that biases pawl 18 in a counter-clockwise direction such that the tip 18*a* is forced radially outwardly. The biasing direction of the pawl spring 18*d* is indicated in FIG. 2*b* by corresponding arrows. The pawl spring 18*d* also produces an axial bias force that acts as axial return force on the pawl 18.

To accommodate the pawl 18 in the driver 11, several pawl receiving openings 11*a* or grooves are provided in the driver 11 as shown in FIGS. 15*a* and 15*b*. The axial length of the power receiving opening 11*a* is adapted to allow the axial movement of the pawl 18 along the pin 18*c*.

The power transmission unit 16 further comprises a pawl engaging device that can be, for example, a ratchet ring 19 coupled to the hub shell 12 (FIG. 1 and FIG. 2*b*). The pawl 18 and the ratchet ring 19 are engageably disposed to transmit, in the engaged state, rotational power from the driver 11 to the cup 120 and, thus, to hub shell 12. The ratchet ring 19 comprises a friction rotating body 20 that includes a plurality of ratchet teeth 21 on an inner peripheral surface 22 of the friction rotating body 20 as illustrated in FIGS. 1 and 2*b*. The friction rotating body 20 is connected to a friction spring 23 that is disposed between the friction rotating body 20 and the hub shell 12. The friction spring 23 is arranged in a spring receiving groove formed on an outer peripheral surface of the friction rotating body 20.

The clutch unit 17 comprises a control ring 24 which is coupled to shift mechanism 14. The control ring 24 is rotatably disposed relative to the hub axle 10 for coupling with the auxiliary power transmission mechanism 15. The control ring 24 comprises a plurality of protrusions 24*a* and 24*b* and a plurality of recesses 24*c* that are disposed in an alternating manner on an outer circumferential surface of the control ring 24.

The protrusions 24*a* and 24*b* extend axially in direction of the driver 11 and are inclined by an angle of 90° with respect to a vertical plane defined by the control ring 24. The axial protrusions 24*a* and 24*b* are arranged on the side of the control ring 24 proximate to the driver 11. As seen in FIG. 14*c*, the control ring 24 has an L-shaped cross-sectional form in the area of the axial protrusions 24*a* and 24*b*.

On an inner peripheral surface of the control ring 24, at least one, specifically three radially inwardly extending protrusions 24*d* are provided. The radial protrusions 24*d* function as a rotation limiting structure 27*a* that stop a rotational movement of the control ring 24*a*. The structure of the control ring 24 is best seen in FIGS. 10*a*, 10*b*, and 10*c*.

The control ring 24 is rotatably supported by a differential rotation body 25 that is disposed to axially move relative to the hub axle 10 and the driver 11. In this embodiment, the control ring 24 is axially fixed to the differential rotation body 25 which means that the control ring 24 can only carry out a rotational movement relative to the differential rotation body 24 but not an axial movement. Since the differential rotation body 24 is axially movable relative to the hub axle 10 and the driver 11, also the control ring 24 together with the differential rotation body 25 can be axially moved relative to the hub axle 10 and to the driver 11. Therefore, the control ring 24 is allowed to carry out both a rotational and an axial movement relative to the hub axle 10 and the driver 11.

Specifically, the differential rotation body 25 is disposed to axially move on the feed cam 26. The differential rotation body 25 is non-rotatably connected to the clutch cam portion 176 of the feed cam 26 by a wave washer 25*a* and a tension plate 14 that are arranged on an inner peripheral surface of the differential rotation body 25.

The differential rotation body 25 further comprises radial protrusions 25*c* that are formed on an outer peripheral surface of the differential rotation body 25 as best seen in FIGS. 13*a* and 13*b*. The radial protrusions 25*c* function as rotation limiting structure 27*b* that cooperate with the radial protrusions 24*d* of the control ring 24. That is, the control ring 24 can be rotated on the differential rotation body 25 with the rotational movement of the control ring 24 being stopped if the radial protrusion 24*d* of the control ring 24 and the radial protrusion 25*c* of the differential rotation body 25 abut against each other.

As further seen in FIG. 13*a* to 13*c* and FIG. 1, the differential rotation body 25 comprises an axially extending groove 25*d* for receiving one end of a control ring spring 24*e*. The control ring spring 24*e* biases the control ring 24 in a circumferential direction relative to the differential rotation body 25 in order to return control ring 24 to an initial position after control ring 24 has been rotated on the differential rotation body 25. The control ring 24 is also biased in an axial direction by the return spring 24f that is inserted between the driver 11 and the control ring 24.

The clutch unit 17 further comprises the clutch ring 28 that can be engaged with and disengaged from the planet gear carrier 550 of the power transmission mechanism 13 in a known manner as described in European Patent Publication No 1 323 627 A2. The clutch ring 28 is coupled with the differential rotation body 25 such that both the clutch ring 17 and the differential rotation body 25 are axially movable on the clutch cam portion 176.

The function and operation of the auxiliary power transmission mechanism 15 is described as follows.

FIG. 2a shows an initial position of the auxiliary power transmission mechanism 15, in particular of the pawls 18, if the power transmission 13 is in speed stages 5 to 8 and the clutch ring 28 is engaged with the planet gear carrier 550. In this situation, the pawls 18 are axially moved to the normal position, which is to an end position distant from the driver 11 (leftmost side position). The pawls 18 are moved to normal positions by the pawl spring 18d respectively.

Moreover, the pawl spring 18d biases the respective associated pawl 18 in a counter-clockwise direction. This has the effect that the tip 18a of the pawl 18 and the ratchet teeth 21 of the ratchet ring 19 engage. As should be evident from FIG. 2a, the protrusions 24a and 24b of the control ring 24 do not contact the tail 18a of the pawl 18.

In speed stages 6 to 8, the hub shell 12 rotates faster than the ratchet ring 19 and, also, the friction rotation body 20 and the friction spring 23. In other words, the hub shell 12 overtakes the friction rotation body 20 and the friction spring 23. Since the friction rotation body 20 and the friction spring 23 act as a one-way slip clutch, no rotational force is transmitted from the driver 11 to the hub shell 12 by the auxiliary power transmission mechanism 15. Therefore, the rotational force is only transmitted by the power transmission mechanism 13.

In speed stage 5, the hub shell 12, the driver 11 and the ratchet ring 19 rotate at the same speed. As explained, the friction rotation body 20 and the friction spring 23 avoid a rotational force being transmitted to the hub shell 12 at the same time both by the power transmission mechanism 13 and the auxiliary power transmission mechanism 15.

The invention is not restricted to a slip clutch, but can generally include other one-way clutches. For example, it would also be possible to employ a one-way roller clutch or pawl clutch replacing the friction rotation body 20 and the friction spring 23. However, the present embodiment is advantageous since it leads to a more compact and light weight construction than would be possible if a pawl clutch is used. Moreover, a roller clutch would not be able to couple as quickly as the power transmission unit 16 of the present embodiment using the friction rotation body 20 and the friction spring 23 as a slip clutch.

When the bicycle decelerates and the cyclist wishes to shift from speed stage 5 to speed stage 4 (down shift), the clutch ring 28 is disengaged from the planet gear carrier 550 as shown in FIG. 3a. The actuation of clutch ring 28 by the shift key member 700 is described in detail in European Patent Publication No. 1 323 627 A2. As shown in FIG. 3a, the clutch ring 28 is moved together with the control ring 24 and the differential rotation body 25 towards the driver 11 that is to the right side in FIG. 3a. Thereby, the protrusions 24a of the control ring 24 contact the tail 18b of the pawl 18. The control ring 24 is further moved towards the driver 11 and also pushes pawl 18 towards the driver 11. In this situation, the pawls 18 are maintained in engagement with the ratchet ring 19 by the pawl spring 18d.

FIG. 4a shows a state of the auxiliary power transmission mechanism 15 with the pawls 18 being moved to an end position close or proximate to the driver 11. In this situation, the clutch unit 17, comprising the clutch ring 28, the control ring 24 and the control ring spring 24e, arrive at a position corresponding to speed stage 4. As seen FIG. 4b, the pawls 18 still engage the ratchet ring 19.

Figure 5B:
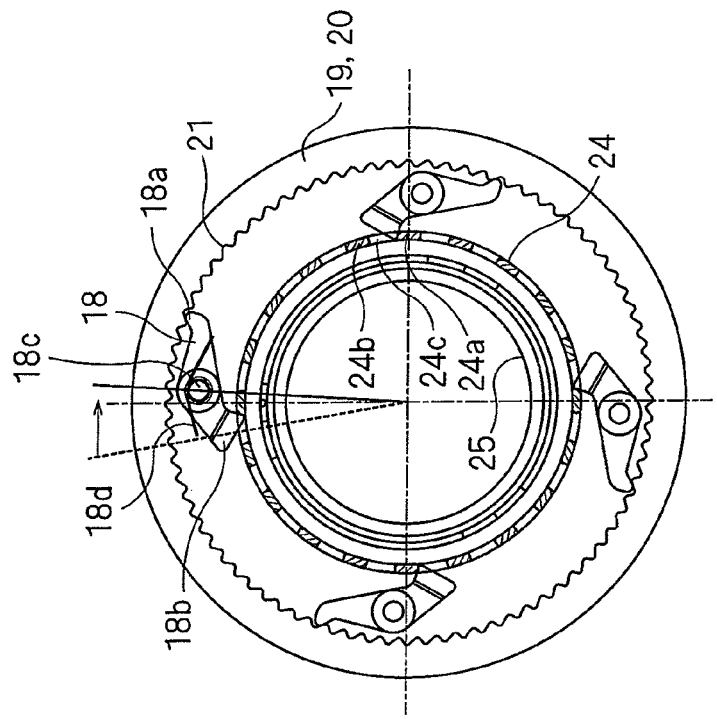
Figure 5A:
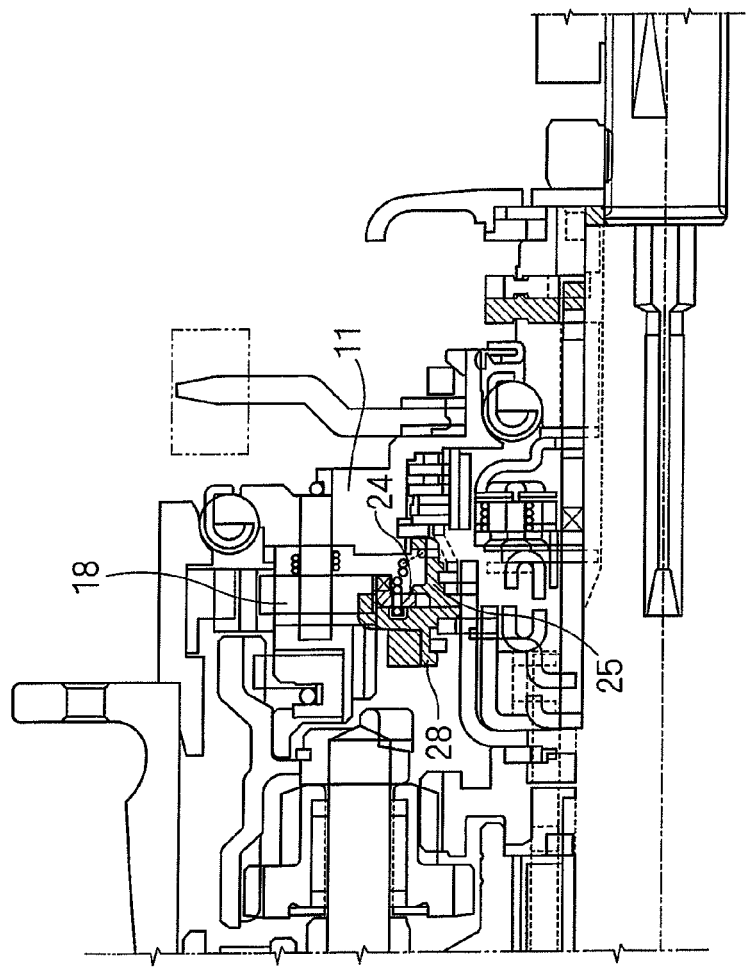
FIG. 5a illustrates the hub transmission in a state with the pawls of the auxiliary power transmission mechanism being in an intermediate position.
Figure 5C:
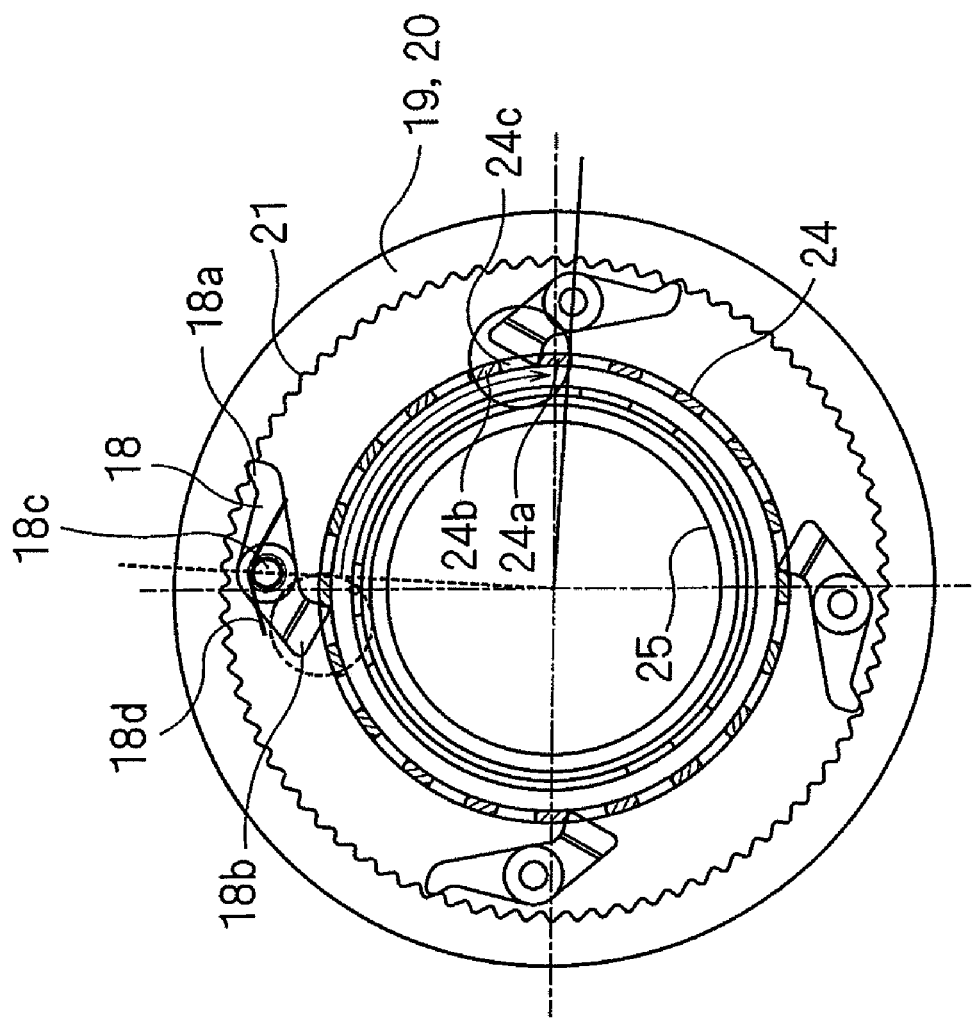
FIG. 5c is an axial elevational view of the auxiliary power transmission mechanism in a state according to FIG. 5a with the control ring being rotated.

FIGS. 5a and 5b show an intermediate position of the pawls 18. As indicated by an arrow in FIG. 5b, the pawl 18 rotates with the driver 11 relative to the control ring 24. Thus, the tail 18b of the pawl 18 moves between the protrusions 24a and 24b into the recess 24c. As the pawl 18 engages the recess 24c of the control ring 24, the pawl 18 is pushed back away from the driver 11 by the spring force exerted by the pawl spring 18d. Hence, the tail 18b is received in the recess 24c between protrusions 24a and 24b of the control ring 24. As further shown in FIG. 5c, the control ring 24 rotates together with the driver 11 relative to the differential rotation plate 25 and against the biasing force of the control ring spring 24e, since the tail 18b of the pawl 18 is engaged with the recess 24c between the protrusions 24a and 24b of the control ring 24.

The rotational movement of the control ring 24 is limited by a cooperation of the rotation limiting structures 27a and 27b, that is by the radial protrusion 24d of the control ring 24 and the radial protrusion 25c of differential rotation body 25, respectively. In the embodiment according to FIG. 5c, the rotation angle is 90°. The rotation angle can be set to other values, e.g. 120°. During rotation, the pawl 18 remains in the intermediate position and transmission auxiliary path is maintained as auxiliary speed stage 5. During the rotation of the control ring 24 with the driver 11, the second sun gear 164 is locked for speed stage 4. At the same time, transmission auxiliary path is maintained corresponding to speed stage 5.

FIGS. 6a and 6b show the auxiliary power transmission mechanism 15 in a state where the pawls 18 are in the intermediate position and disengaged from the ratchet ring 19. As best seen in FIG. 6b and described in conjunction with FIG. 5c, the control ring 24 stops to rotate together with the driver 11 with the effect that a relative movement between driver 11 and control ring 24 occurs. Due to the relative movement between the driver 11 and the control ring 24, the protrusion 24a pushes against the tail 18b of the pawl 18 which rotates around the pin 18c against the circumferential biasing force of the pawl spring 18d. In other words, the tail 18b is overloaded by the protrusion 24a of the control ring 24. Due to the rotation of the pawl 18, the tip 18a disengages from the ratchet ring 19 as shown in FIG. 6b.

The shifting from speed stage 5 to speed stage 4 is now complete.

As shown in FIG. 7a and 7b, the pawls 18 are pushed back to the normal position (away from driver 11) by the pawl spring 18d since the pawls 18 are disengaged from the recess 24c of the control ring 24. Due to the circumferential biasing force of the control ring spring 24e, the control ring 24 is returned to the normal position. The return rotation of the control ring 24 is limited by the radial protrusions 24d and 25c formed on the control ring 24 and the differential rotation body 25, respectively. The return rotation of control ring 24 is indicated in FIG. 7b by an arrow. In this position of the pawls 18, the tail 18b of respective the pawl 18 contacts an outward annular surface of the control ring 24 and the pawl 18 is maintained in the disengaged state.

Figure 8A:
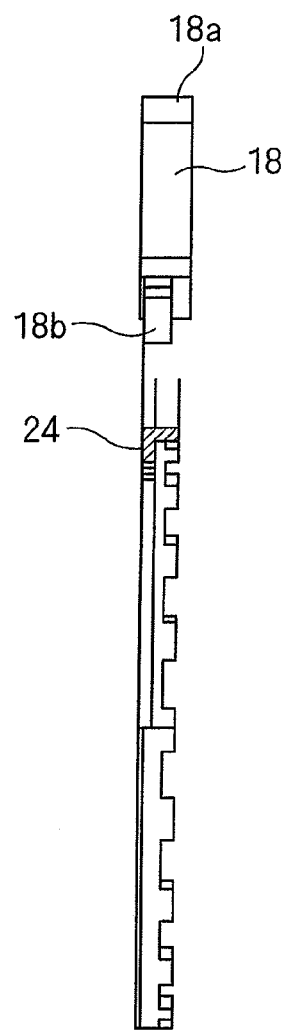
FIG. 8a to 8c illustrate different positions of the control ring relative to the pawls of the auxiliary power transmission mechanism.
Figure 8B:
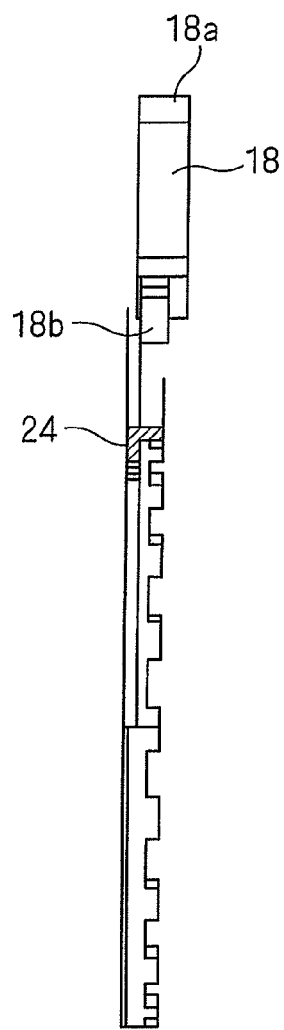
Figure 8C:
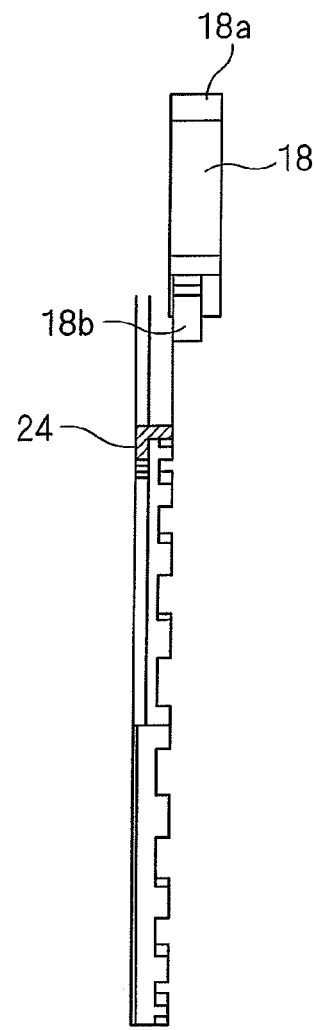

FIGS. 8a to 8c illustrate the different positions of the pawl 18 relative to the control ring 24 in hub axle direction. FIG. 8a shows the initial position of the pawl 18 with the pawl 18 is in an end position distant from the driver 11 (leftmost side position). The tail 18b of the pawl 18 contacts the outward annular surface of the control ring 24. FIG. 8b shows the intermediate position of the pawls 18 with the tail 18b of pawl 18 engaging the recess 24c of the control ring 24. FIG. 8c shows the end position of the pawl 18 proximate to the driver 11 with the tail 18b of the pawl 18 contacting the protrusion 24a of the control ring 24.

In summary, when the bicycle slows down and the cyclist wishes to shift from speed stage 5 to speed stage 4 (downspeed), after the protrusions 24a of the control ring 24 have the contacted tail 18b of the pawl 18, the control ring 24 is further moved towards the driver 11 and also pushes the pawl 18 towards the driver 11. And then, after the down shifting from speed stage 5 to speed stage 4 is complete, the pawls 18 are pushed back to the normal position (away from the driver 11) by the pawl spring 18d.

In other words, in the illustrated embodiment, the auxiliary power transmission mechanism 15 establishes a power transmission unit that comprises at least one movable pawl relative to control ring in hub axle direction. The invention is not limited to this axially movable pawl, but also envisages other mechanisms that allow returning back of the movable control ring relative to the pawl in hub axle direction.

When the bicycle speeds up and the cyclist wishes to shift from speed stage 4 to speed stage 5 (up shift), the clutch ring 28 is moved away from the driver 11 by the return spring 24f. When the clutch ring 28 moves to the left side (position of speed stage 5), the clutch ring 28 detaches from the tail 18b of the pawl 18. The pawl 18 rotates by the pawl spring 18d to engage with the ratchet ring 19 of the friction rotating body 20.

Then, a tentative shifting to speed stage 5 is carried out. The auxiliary power transmission path corresponding to speed stage 5 comprises the driver 11, the pawl 18, the friction rotating body 20, the friction spring 21, the hub shell 12. While transmission auxiliary path corresponding to speed stage 5 is maintained, the second sun gear 164 is released. The clutch ring 28 engages with the planet gear carrier 550. The shifting from speed stage 4 to speed stage 5 is now complete.

Figure 9:
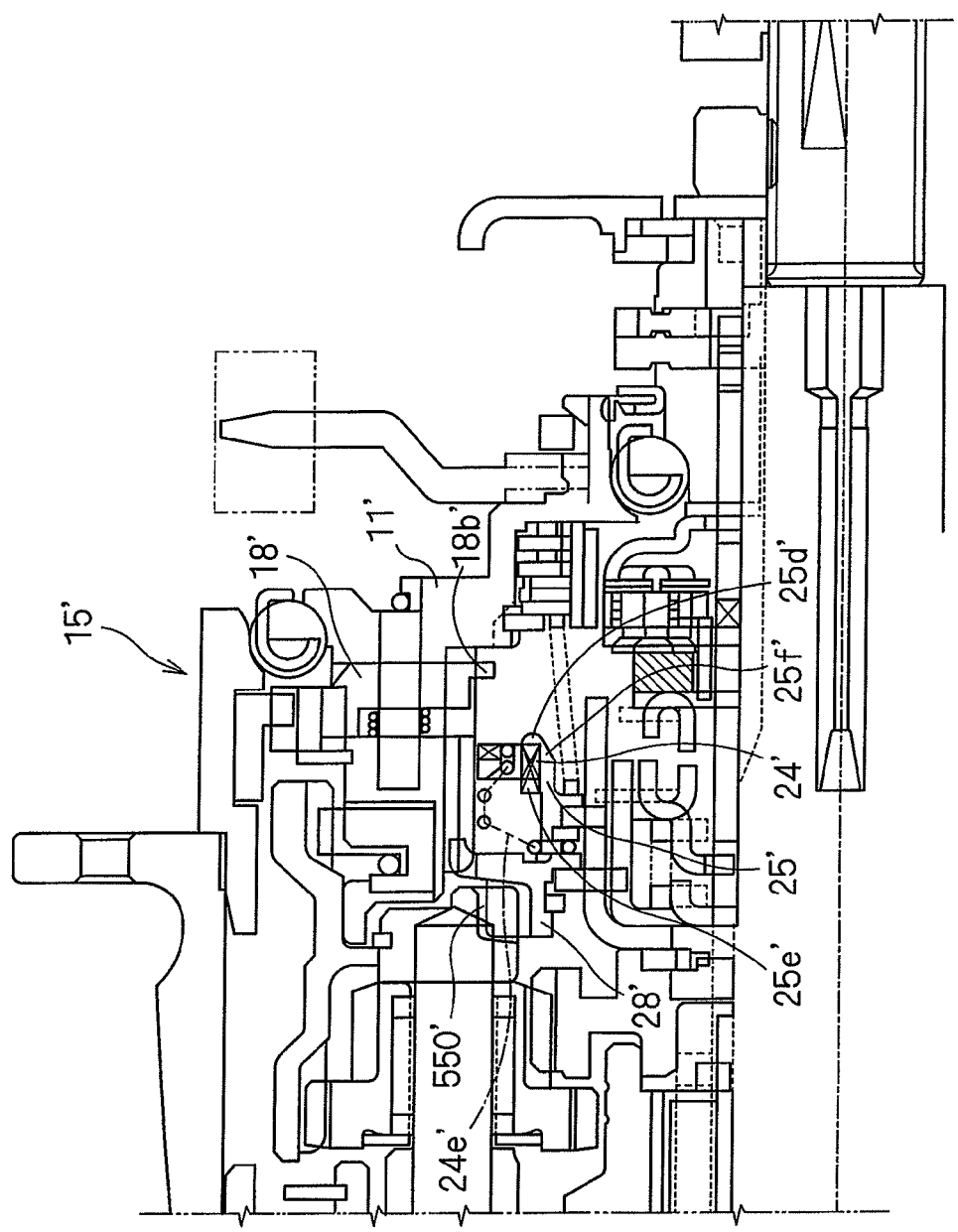
FIG. 9 is a partial view of a hub transmission according to another embodiment, with the auxiliary power transmission mechanism being in an initial position for speed stages 5 to 8.
Figure 10:
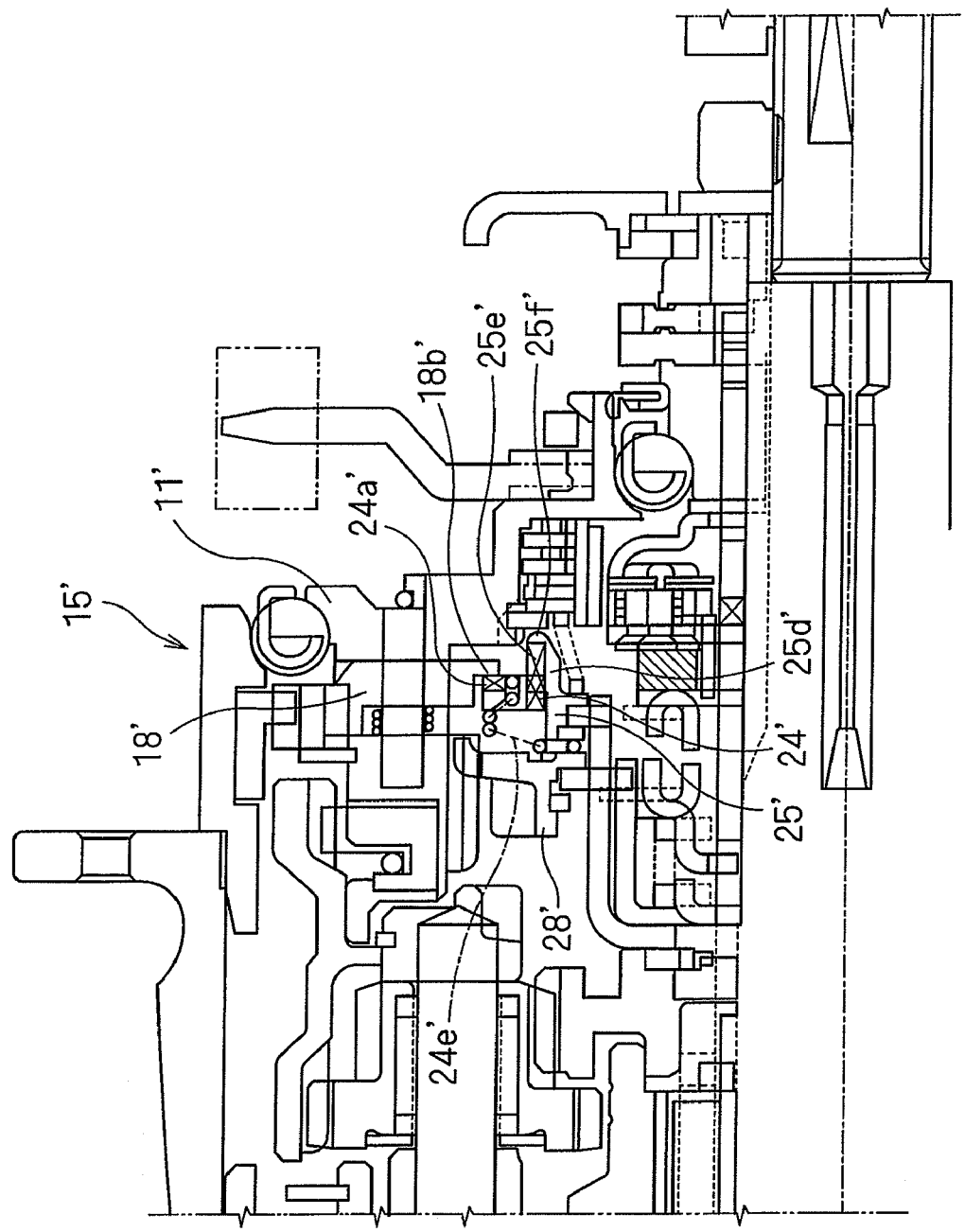
FIG. 10 illustrates the hub transmission according to FIG. 9 with the clutch unit and the power transmission unit begin to be engaged.
Figure 11:
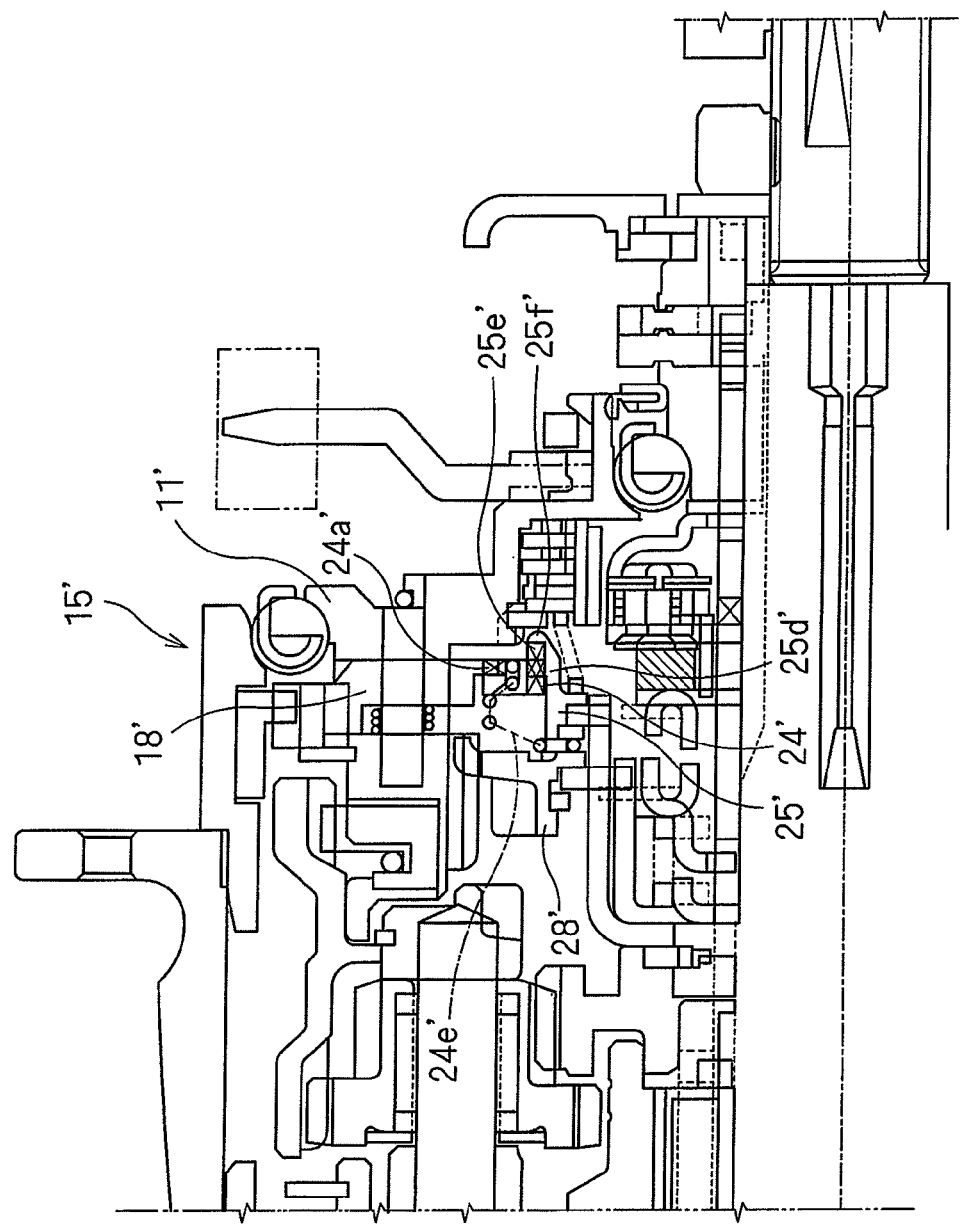
FIG. 11 illustrates the hub transmission according to FIG. 9 with the clutch unit being in an intermediate position.

FIGS. 9 to 11 illustrate another embodiment that distinguishes from the aforementioned embodiment by the arrangement for the relative movement between a control ring 24' and a pawl 18'. In the following, only the components different between the two embodiments are explained.

The embodiment according to FIGS. 9 to 11 is based on the idea to allow an axial movement of the control ring 24' relative to a differential rotation body 25' for engaging/disengaging the pawl 18'. Since the relative axial movement between the control ring 24' and the pawl 18' is effected by axially moving the control ring 24' on the differential rotation body 25', the pawl 18' can be axially fixed to the driver 11'. In contrast, the engagement/disengagement function of the embodiment according to FIG. 1 is accomplished by allowing the pawl 18 to axially move relative to the driver 11 while the control ring 24 is axially fixed to the differential rotation body 25.

In particular, the differential rotation body 25' comprises an axially extending protrusion 25d'. The axial protrusion 25d' of the differential rotation body 25 comprises an axial guide part 25e' that support the control ring 24' and allow an axial movement of the control ring 24' relative to the differential rotation body 25'. The inner peripheral surface of the control ring 24' is adapted to cooperate with axial guide part 25e' such that both a rotational and an axial movement of the control ring 24' relative to the differential rotation body 25' is allowed.

As can be seen in FIG. 9, the axial protrusion 25d' with axial guide part 25e' of differential rotation body 25' are spaced apart from the clutch ring 28'. In the space between the clutch ring 28' and the axial protrusion 25d', the control ring spring 24e' is disposed which biases the control ring 24' both in an axial and a circumferential direction with respect to the differential rotation body 25'. Thus, the control ring spring 24e' is disposed between the clutch ring 28' and the control ring 24'. Therefore, the axial biasing force exerted by the control ring 24e' on the control ring 24' acts in a direction towards the driver 11'.

In contrast, the control ring spring 24e of the embodiment according to FIG. 1 is disposed on the other side of the control ring 24, that is between axial protrusion 25d and the control ring 24. In the embodiment according to FIG. 1, axial protrusion 25d functions as a fixation for the control ring spring 24e, whilst the axial protrusion 25d' of the embodiment according to FIG. 9 comprises the axial guide part 25e' that support the control ring 24'.

It follows from the above explanations that in the embodiment according to FIG. 9, the axial return force is generated by the control ring spring 24e', whilst in the embodiment according to FIG. 1, the axial return force is generated by the pawl spring 18d. Thereby, it is possible that in the embodiments according to FIG. 1 and FIG. 9, respectively, the axially movable component, namely the pawl 18 (FIG. 1) and the control ring 24' (FIG. 9) can be brought back into the initial position when the relative movement between the two components and the engagement/disengagement operation has been accomplished.

In the following, the function of the auxiliary power transmission mechanism 15' of the embodiment according to FIG. 9 will be explained.

FIG. 9 shows an initial position of auxiliary power transmission mechanism 15' similar to the position according to FIG. 2a. In this initial position, the power transmission mechanism 13 is in speed stages 5 to 8, and the clutch ring 28' is engaged with planet gear carrier 550'. As mentioned before, the pawls 18' are axially fixed to the driver 11. This means, that only a rotational movement of the pawl 18 relative to the driver 11 is allowed. The control ring 24' is in the normal position. That is, the control ring spring 24e pushes the control ring 24e to the end position where the control ring 24' is most distant from the clutch ring 28'. The axial movement of the control ring 24' away from the clutch ring 28' is limited by a stopper 25f which radially extends from the axial protrusion 25d' on the side of the differential rotation body 25' that faces the driver 11'.

As explained in connection with the embodiment according to FIG. 1, the rotational force is transmitted to the hub shell 12 by the power transmission mechanism 13. The one-way clutch, in particular the friction rotating body 20 and the friction spring 23 are in an idle state.

As should be evident from FIG. 10, the clutch ring 28' and the planet gear carrier 550' are decoupled and the clutch ring 28' together with the differential rotation body 25' and the control ring 24' is moved towards the driver 11'. In the position according to FIG. 10, the clutch ring 24' and the differential rotation body 25' arrive at a position corresponding to speed stage 4, close or proximate to the driver 11. In this position, the auxiliary power transmission path is established by the auxiliary power transmission mechanism 15' since the friction rotating body 20 and the friction spring 23 couple the hub shell 12 to the pawl 18'. Thus, rotational force is transmitted from the driver 11' to the hub shell 12 by the auxiliary power transmission mechanism 15' with a gear ratio of 1.0. Therefore, the same gear ratio as in speed stage 5 is maintained.

It is further seen in FIG. 10 that the axial protrusion 24a' of the control ring 24' contacts the tail 18b' of the pawl 18'. Since the control ring 24' is moved towards the driver 11' by the clutch ring 28', respectively the shift key member 700, the control ring 24' is pushed back towards the clutch ring 28' relative to the differential rotation body 25 against the biasing force of the control ring spring 24e'.

FIG. 11 shows an intermediate position of the control ring 24' with protrusions 24a' and 24b' of the control ring 24' and the recess 24c' between protrusions 24a', 24b' engaging the tail 18b' of the pawl 18'. Due to the engagement of the control ring 24' with the tail 18b' of the pawl 18', the control ring 24' moves toward the driver 11' (to the right side in FIG. 11) relative to the differential rotation body 25 forced by the control ring spring 24e'. The disengagement of the control ring 24' and the pawl 18' is effected once the intermediate position is terminated as explained in detail in connection with FIGS. 5a and 6a of the embodiment according to FIG. 1. Therefore, also in this embodiment, the rotation limiting means (not shown) limit the rotational movement of the control ring 24' relative to the differential rotation body 25' with the effect that the protrusions 24a' push against the tail 18b' of the pawl 18' thereby the disengaging pawl 18' from the ratchet ring 19.

Prior to the disengagement of the pawl 18', the power transmission mechanism 13 has been shifted, in particular the second sun gear 164 has been locked and the power transmission path is established by the (main) power transmission mechanism 13.

Figure 12:
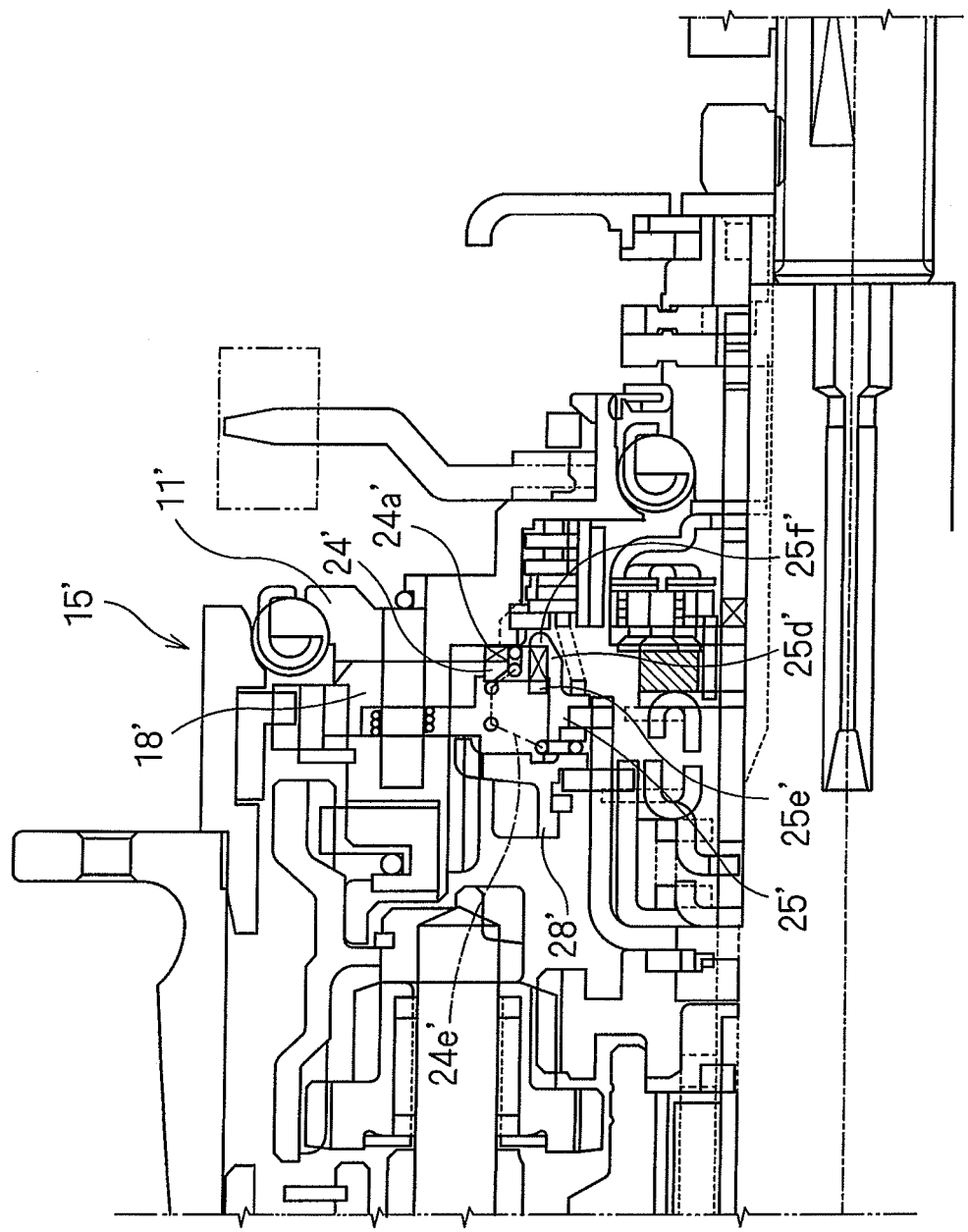
FIG. 12 illustrates the hub transmission according to FIG. 9 with the clutch unit being in an initial position for speed stages 1 to 4.

FIG. 12 shows the state in which the protrusions 24a' and 24b' and the recess 24c' of the control ring 24' are disengaged from the tail 18b' of the pawl 18'. Due to the axial biasing force of the control ring spring 24e', the control ring 24' is moved towards the driver 11' relative to the differential rotation body 25'. The control ring 24' is moved to the normal initial position where the control ring 24' is pushed against the stopper 25f by the control ring spring 24e'. The pawl 18' is maintained in the disengaged position as the tail 18b' of the pawl 18' contacts the outer peripheral surface of the control ring 24'. The power transmission mechanism 13 can now be shifted between speed stages 1 to 4.

The up-shift operation of transmission hub according to FIGS. 9 to 12 is carried out vice versa and functions in an analogous manner as the up-shift operation of the embodiment according to FIG. 1.

In the aforementioned embodiments the, auxiliary power transmission mechanism 15 and 15' establishes an auxiliary power transmission path corresponding to speed stage 5 (gear ratio: 1,0). The invention is not limited to this specific gear ratio of the auxiliary power transmission mechanism 15, but also envisages other mechanisms that allow for an auxiliary power transmission path.

Moreover, the principle to establish an auxiliary power transmission path for shifting the main power transmission mechanism in an unloaded state can be applied to hub transmissions having other power transmission mechanisms than described herein. For example, the auxiliary power transmission mechanism can be applied to a planetary gear mechanism that produces, for example, only 6 speed stages.

The invention presents the advantage to enable a shockless, or at least considerably shock-reduced, shifting of the hub transmission by a relatively simple and compact structure thereby significantly improving the comfort of a cyclist when actuating the hub transmission.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hub transmission comprising:
   a hub axle;
   a driver rotatably supported by the hub axle;
   a hub shell rotatably supported by the hub axle;
   a power transmission mechanism operatively disposed between the driver and the hub shell to transmit rotational power from the driver to the hub shell through a plurality of power transmission paths;
   a shift mechanism operatively coupled to the power transmission mechanism to select one of the power transmission paths; and
   an auxiliary power transmission mechanism disposed between the driver and the hub shell to transmit rotational power from the driver to the hub shell through an auxiliary power transmission path during shifting such that load paths of the power transmission mechanism for the plurality of power transmission paths are in a substantially unloaded state with no rotational power being transmitted therethrough with the auxiliary power transmission path carrying the load transmitting the rotational power between the driver and the hub shell wherein
   the auxiliary power transmission mechanism includes a power transmission unit coupling the driver to the hub shell and a clutch unit selectively actuating the power transmission unit, the clutch unit includes a control ring which is coupled to the shift mechanism and movably disposed to selectively couple and uncouple the auxiliary power transmission mechanism, the control ring being rotatably and axially movably disposed relative to the hub axle, the control ring also being supported by a differential rotation body and rotatably movable relative to the differential rotation body, and
   the differential rotation body is axially movable relative to the hub axle.

2. The bicycle hub transmission according to claim 1, wherein
the auxiliary power transmission mechanism transmits rotational power from the driver to the hub shell when the power transmission mechanism is actuated by the shift mechanism to change the power transmission path.

3. The bicycle hub transmission according to claim 1, wherein
the auxiliary power transmission mechanism includes at least one pawl coupled to the driver and a pawl engaging device coupled to the hub shell, with the pawl and the pawl engaging device being engagable to selectively transmit rotational power.

4. The bicycle hub transmission according to claim 3, wherein
the pawl is rotatably movably supported by the driver.

5. The bicycle hub transmission according to claim 3, wherein
the pawl is axially fixed to the driver.

6. The bicycle hub transmission according to claim 3, wherein
the pawl engaging device includes a friction rotating body with a plurality of ratchet teeth on an inner peripheral surface of the friction rotating body.

7. The bicycle hub transmission according to claim 1, wherein
the control ring is axially fixed to the differential rotation body.

8. The bicycle hub transmission according to claim 1, wherein
the control ring is axially movable relative to the differential rotation body.

9. The bicycle hub transmission according to claim 1, wherein
the control ring is biased in a circumferential and an axial direction.

10. The bicycle hub transmission according to claim 1, wherein
the clutch unit includes a clutch ring engagable with a planet gear carrier of the power transmission mechanism, with the clutch ring and the differential rotation body being coupled and axially movable.

11. A bicycle hub transmission comprising:
a hub axle;
a driver rotatably supported by the hub axle;
a hub shell rotatably supported by the hub axle;
a power transmission mechanism operatively disposed between the driver and the hub shell to transmit rotational power from the driver to the hub shell through a plurality of power transmission paths;
a shift mechanism operatively coupled to the power transmission mechanism to select one of the power transmission paths; and
an auxiliary power transmission mechanism disposed between the driver and the hub shell to transmit rotational power from the driver to the hub shell through an auxiliary power transmission path during shifting such that a load path of the power transmission mechanism for the power transmission path being shift to is placed in a substantially unloaded state with the auxiliary power transmission path carrying the load, the auxiliary power transmission mechanism including at least one pawl coupled to the driver and a pawl engaging device coupled to the hub shell, with the pawl and the pawl engaging device being engagable to selectively transmit rotational power, the pawl being axially movably supported by the driver.

12. A bicycle hub transmission comprising:
a hub axle;
a driver rotatably supported by the hub axle;
a hub shell rotatably supported by the hub axle;
a power transmission mechanism operatively disposed between the driver and the hub shell to transmit rotational power from the driver to the hub shell through a plurality of power transmission paths;
a shift mechanism operatively coupled to the power transmission mechanism to select one of the power transmission paths; and
an auxiliary power transmission mechanism disposed between the driver and the hub shell to transmit rotational power from the driver to the hub shell through an auxiliary power transmission path during shifting such that load paths of the power transmission mechanism for the plurality of power transmission paths are in a substantially unloaded state with no rotational power being transmitted therethrough with the auxiliary power transmission path carrying the load transmitting the rotational power between the driver and the hub shell, the auxiliary power transmission mechanism includes at least one pawl coupled to the driver and a pawl engaging device coupled to the hub shell, with the pawl and the pawl engaging device being engagable to selectively transmit rotational power, the pawl engaging device including a friction rotating body with a plurality of ratchet teeth on an inner peripheral surface of the friction rotating body, the friction rotating body being connected to a friction spring disposed between the friction rotating body and the hub shell.

13. A bicycle hub transmission comprising:
a hub axle;
a driver rotatably supported by the hub axle;
a hub shell rotatably supported by the hub axle;
a power transmission mechanism operatively disposed between the driver and the hub shell to transmit rotational power from the driver to the hub shell through a plurality of power transmission paths;
a shift mechanism operatively coupled to the power transmission mechanism to select one of the power transmission paths; and
an auxiliary power transmission mechanism disposed between the driver and the hub shell to transmit rotational power from the driver to the hub shell through an auxiliary power transmission path during shifting such that load paths of the power transmission mechanism for the plurality of power transmission paths are in a substantially unloaded state with no rotational power being transmitted therethrough with the auxiliary power transmission path carrying the load transmitting the rotational power between the driver and the hub shell, the auxiliary power transmission mechanism further including a power transmission unit coupling the driver to the hub shell and a clutch unit selectively actuating the power transmission unit, the clutch unit including a control ring which is coupled to the shift mechanism and movably disposed to selectively couple and uncouple the auxiliary power transmission mechanism, the control ring being rotatably and axially movably disposed relative to the hub axle, the control ring being supported by a differential rotation body, the control ring being rotatably movable relative to the differential rotation body, and the control ring and the differential rotation body including a rotation limiting member that stops rotational movement of the control ring.

* * * * *